March 15, 1955 W. J. CALDWELL 2,703,923
MACHINE FOR POSITIONING ARMATURE COILS
Filed Oct. 26, 1950 14 Sheets-Sheet 1

INVENTOR.
Washington J. Caldwell
BY
Falvey, Souther & Stoddenberg

INVENTOR.
Washington J. Caldwell
BY
Falvey, Souther & Stoltenberg

March 15, 1955 W. J. CALDWELL 2,703,923
MACHINE FOR POSITIONING ARMATURE COILS
Filed Oct. 26, 1950 14 Sheets-Sheet 3

INVENTOR.
Washington J. Caldwell
BY

March 15, 1955     W. J. CALDWELL     2,703,923

MACHINE FOR POSITIONING ARMATURE COILS

Filed Oct. 26, 1950     14 Sheets-Sheet 4

INVENTOR.
Washington J. Caldwell
BY

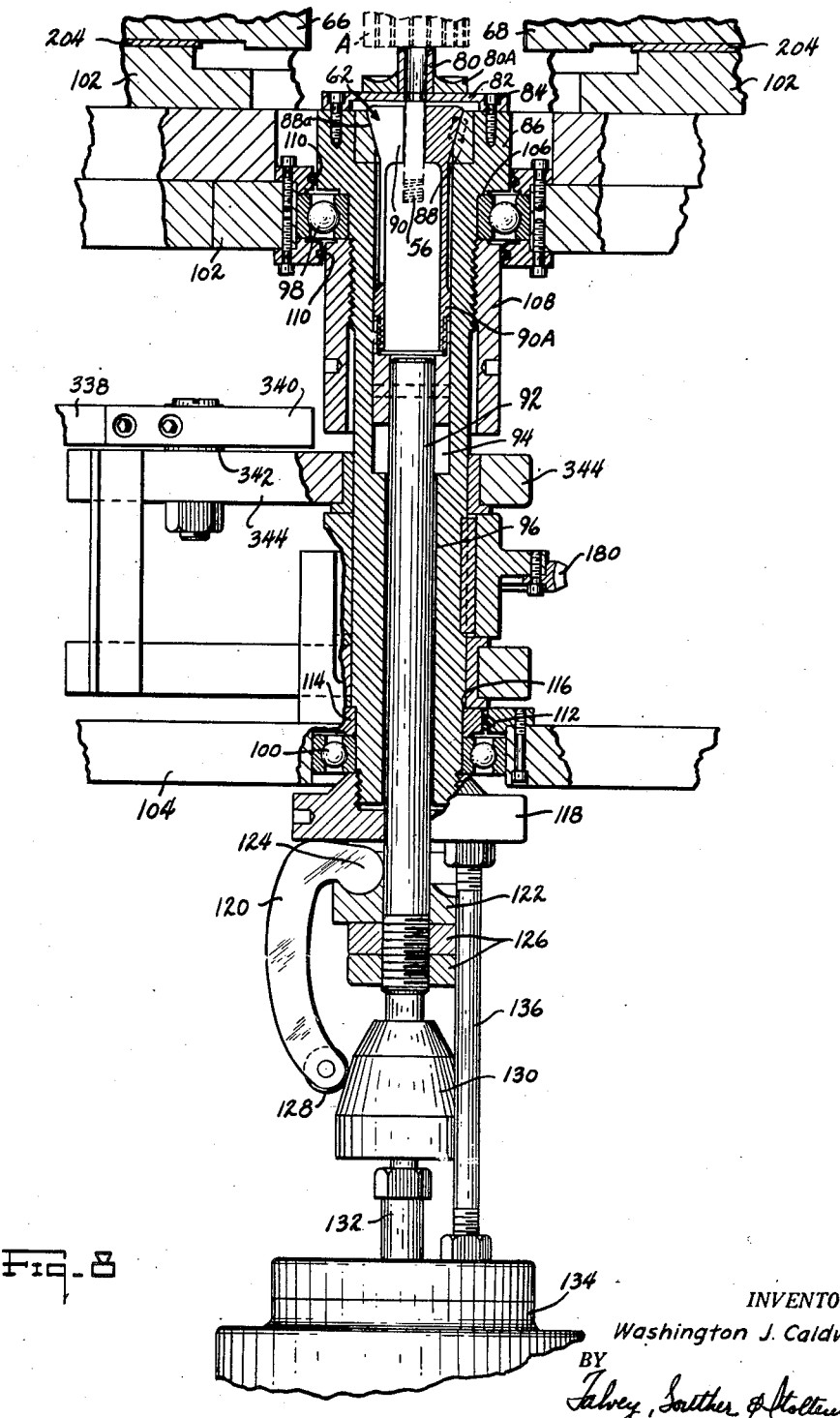

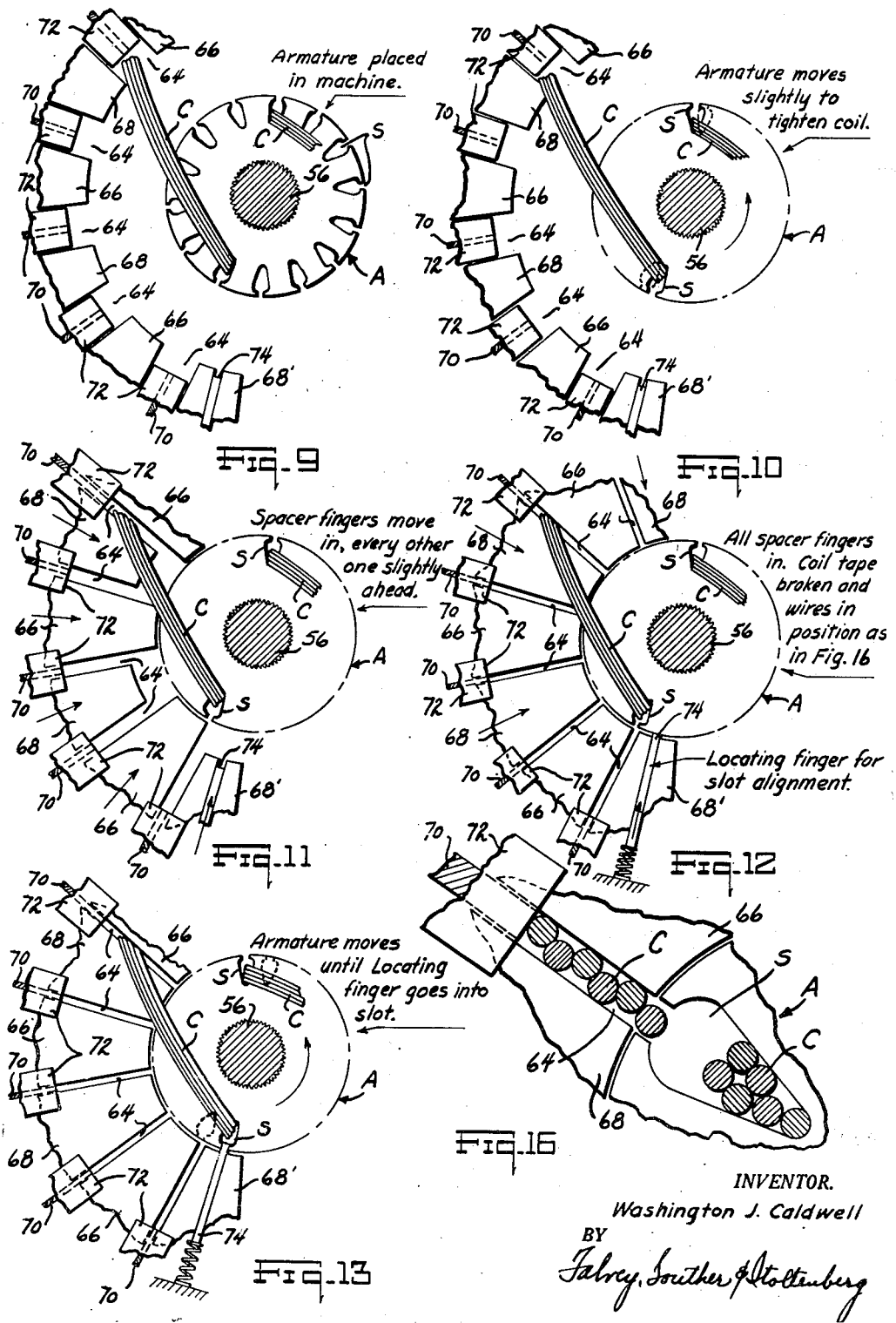

INVENTOR.
Washington J. Caldwell

March 15, 1955  W. J. CALDWELL  2,703,923
MACHINE FOR POSITIONING ARMATURE COILS
Filed Oct. 26, 1950  14 Sheets-Sheet 8

INVENTOR.
Washington J. Caldwell
BY
Falvey, Souther & Stoltenberg

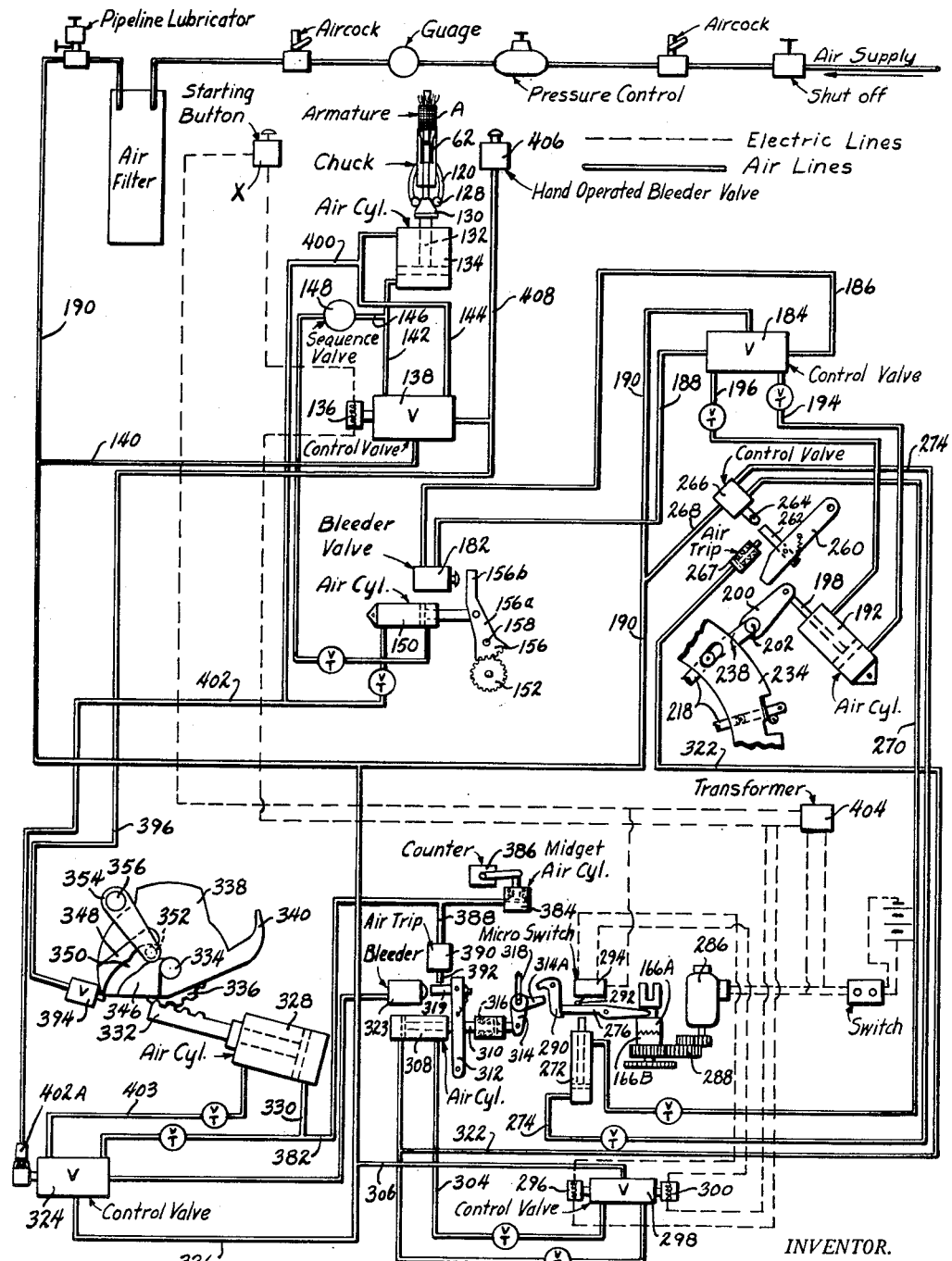

March 15, 1955 W. J. CALDWELL 2,703,923
MACHINE FOR POSITIONING ARMATURE COILS
Filed Oct. 26, 1950 14 Sheets-Sheet 10
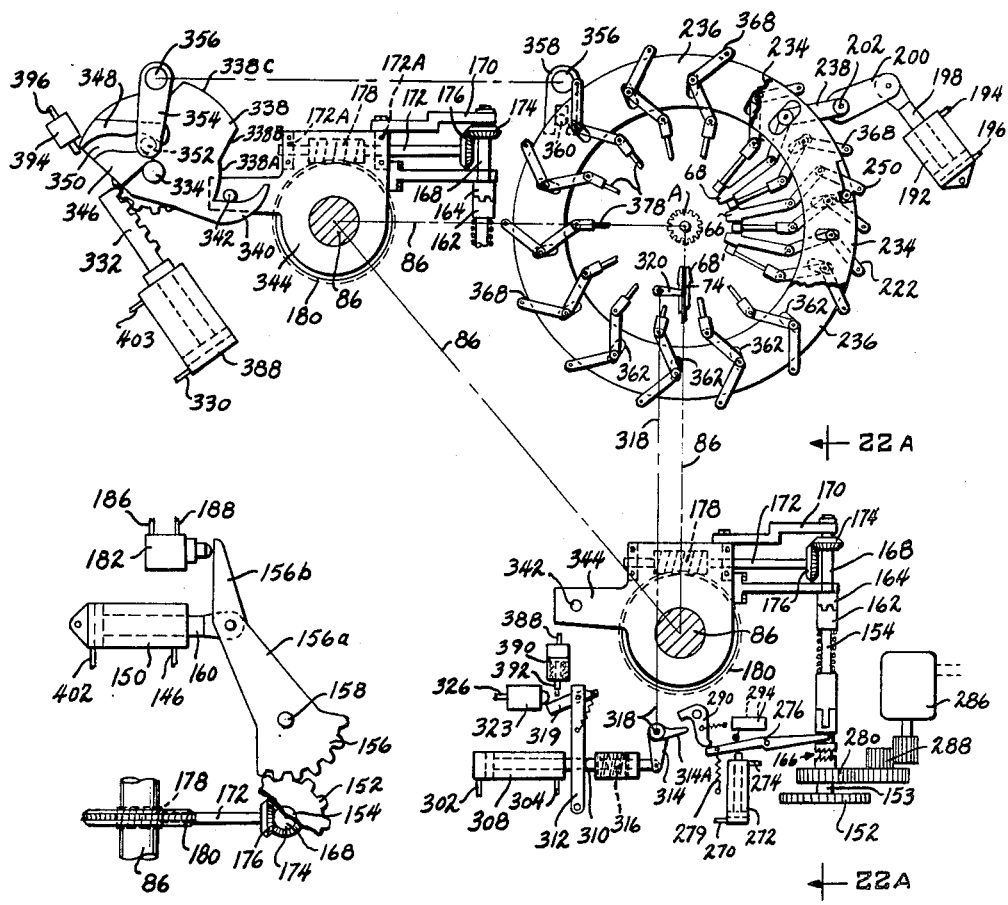
INVENTOR.
Washington J. Caldwell March 15, 1955 W. J. CALDWELL 2,703,923
MACHINE FOR POSITIONING ARMATURE COILS
Filed Oct. 26, 1950 14 Sheets-Sheet 12

INVENTOR.
Washington J. Caldwell
BY
Falvey, Souther & Stoltenberg

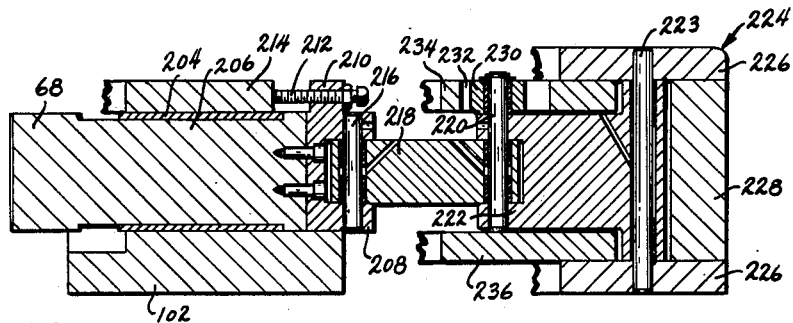
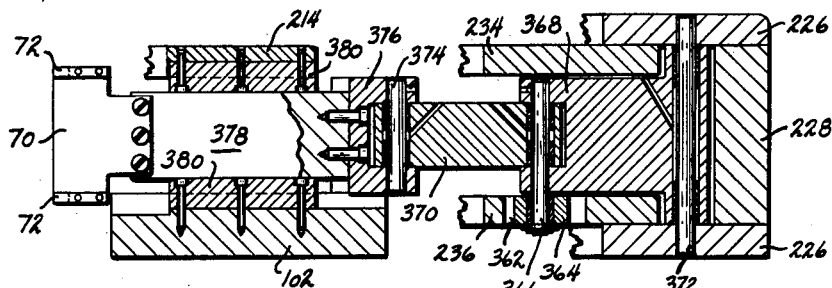
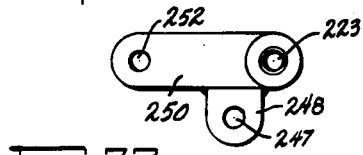
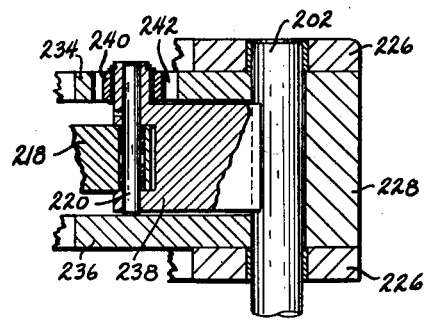
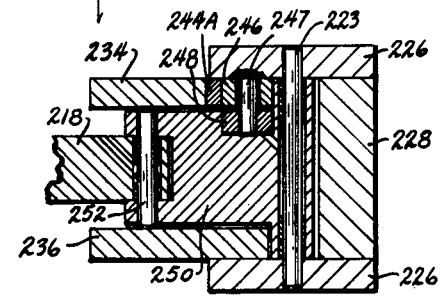
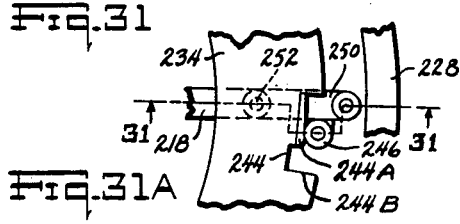

March 15, 1955 W. J. CALDWELL 2,703,923
MACHINE FOR POSITIONING ARMATURE COILS
Filed Oct. 26, 1950 14 Sheets-Sheet 14

INVENTOR.
Washington J. Caldwell
BY ited States Patent Office 2,703,923
Patented Mar. 15, 1955

2,703,923

MACHINE FOR POSITIONING ARMATURE COILS

Washington J. Caldwell, Toledo, Ohio

Application October 26, 1950, Serial No. 192,189

14 Claims. (Cl. 29—205)

This invention relates to machine tools, more particularly to a machine tool for simultaneously positioning generator armature coils in their respective slots in the armature after one side of the coil has been inserted manually in the individual slots.

In the past, generator armature coils were inserted manually by first placing the lower coil side in each of the individual slots of the armature and thereafter the upper coil side was positioned thereabove in the slots in its proper slot displacement as determined by the design of the generator. The positioning of the last or upper coil side was accomplished manually with the sides being positioned one after another starting at a random point on the armature by the use of a press which tended to substantially raise the labor costs involved and also some difficulty was experienced by the operators in stretching the last coil side to be positioned to register with the proper slot. This stretching of the coils necessitated a somewhat larger dimension of all the coils otherwise these last coils could not be positioned on the armatures.

The present invention contemplates the provision of a machine tool which will position the last coil side of all the coils simultaneously after the first coil side has been positioned manually as before. This reduces substantially the labor costs involved and, at the same time, makes possible a saving in material used inasmuch as the simultaneous positioning of the coils obviate the stretching involved in positioning the last coils, so that the coils can initially be made smaller. This, in turn, improves the performance of the generator by reducing the copper losses by heating and the like.

The invention further contemplates the provision of an automatic machine which will carry through all the steps necessary to position the last coil sides of a generator armature in their respective slots simultaneously, so that an operator needs only to place the prepared armature in the machine and start the cycle of operation. Thereafter, the operator removes the just completed armature and inserts a new prepared armature and again starts the cycle of operation. This materially reduces the skill requirements of the operator to a minimum and makes the operation one which can be performed by unskilled labor.

It is, therefore, a principal object of this invention to provide an automatic machine which will position the last sides of generator armature coils simultaneously in their respective slots of the armature.

It is a further object of this invention to provide a machine tool which will perform that step on the manufacture of generator armatures in which all the last sides of the pre-inserted coils are inserted in their respective slots of the armature by a single operation.

It is a further object of this invention to provide a means whereby all the last sides of the generator armature coils may be inserted simultaneously to thereby allow a saving of material and result in a better armature which has smaller operating losses.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 8 is an elevational view, partly in section, of the armature shaft clutching device located at the bottom of the pocket concentric therewith as shown in Fig. 4;

Figure 20:
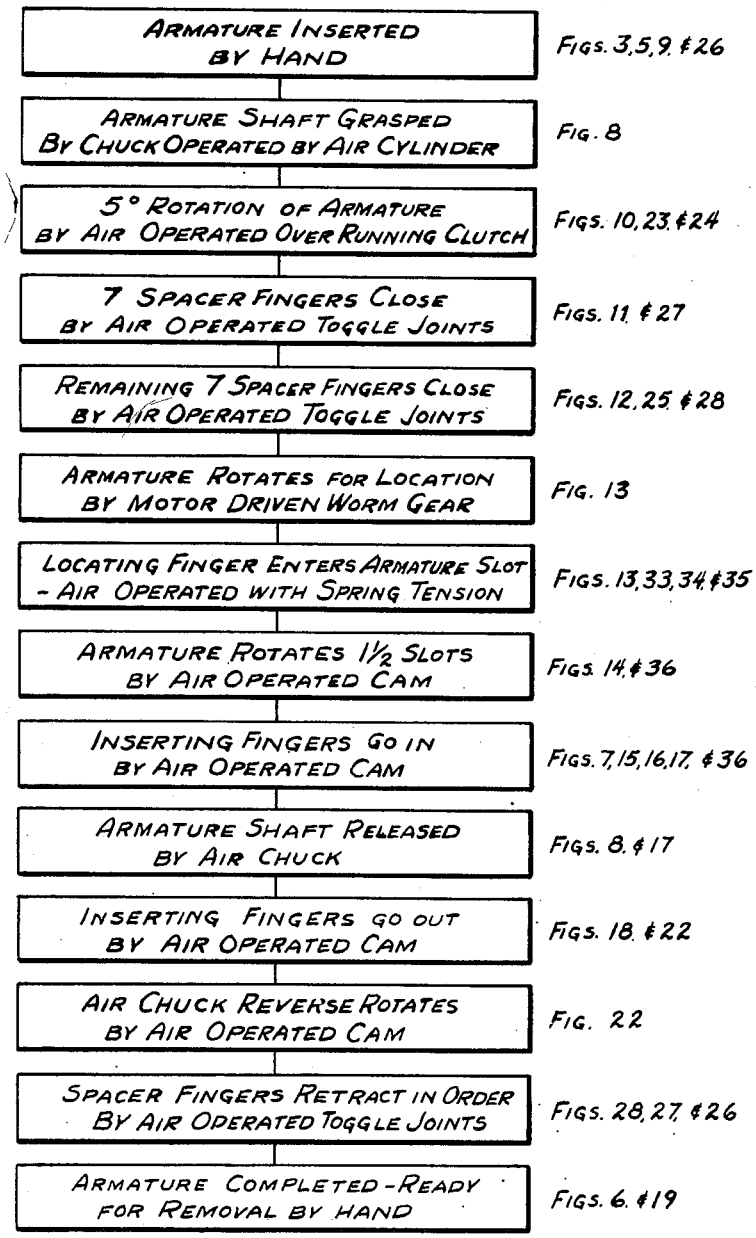
Figure 22A:
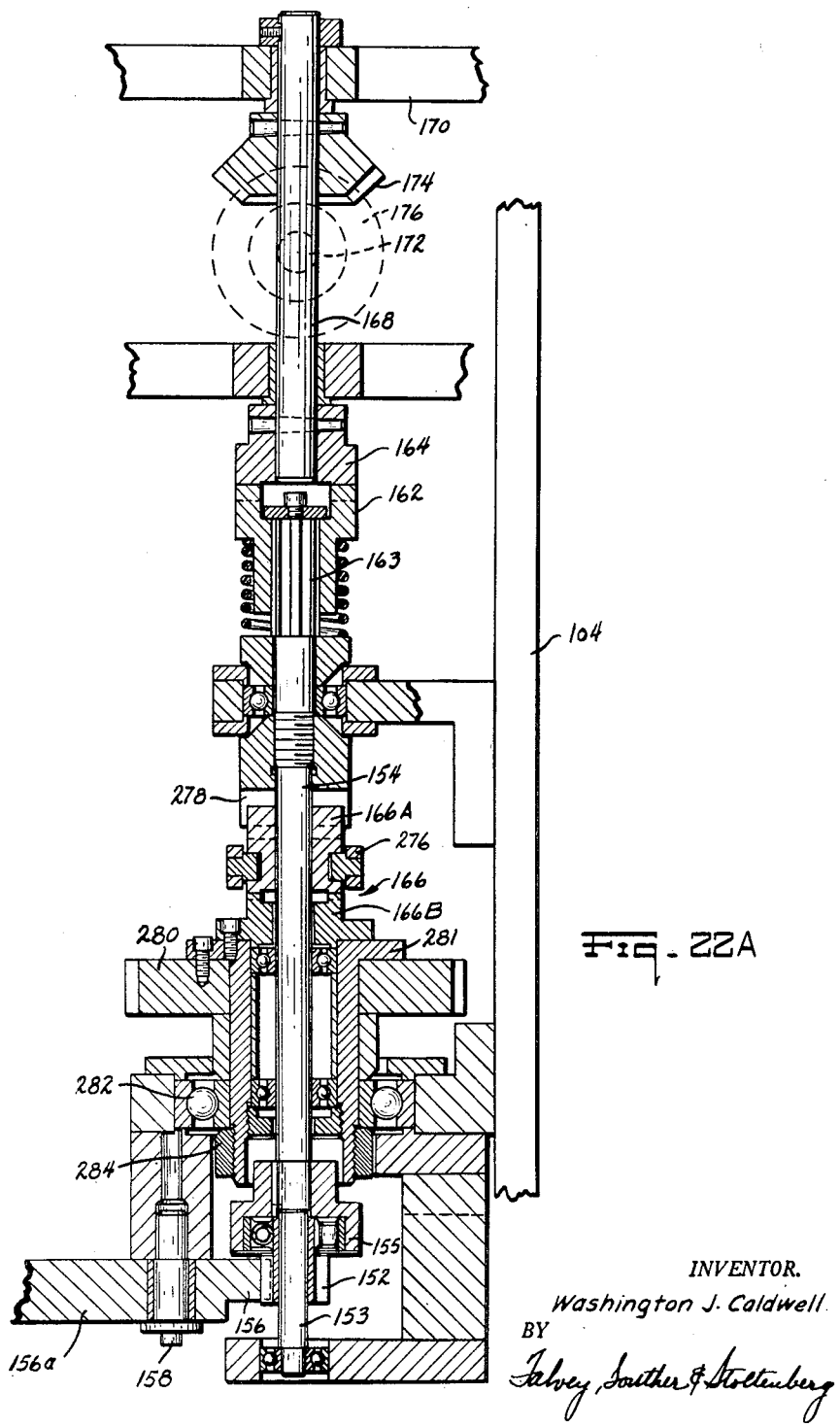
Figure 26:
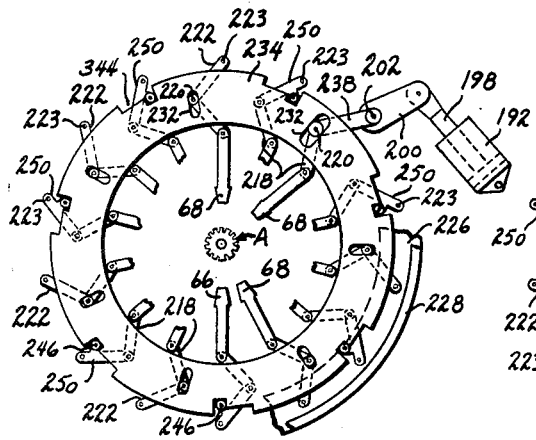
Figure 27:
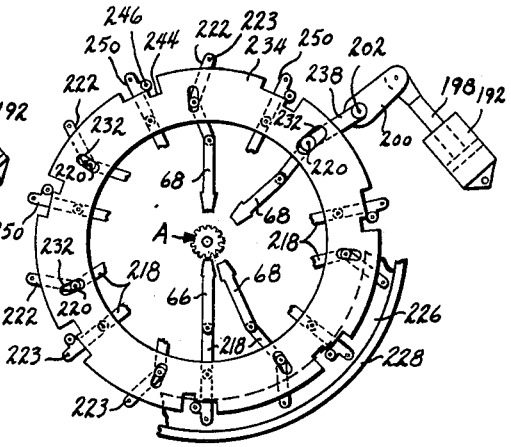
Figure 28:
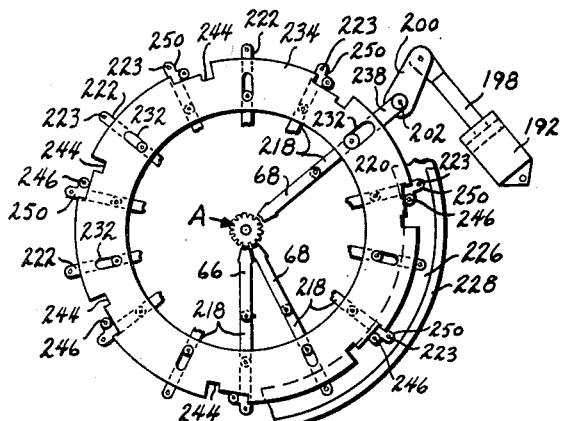
Figure 36:
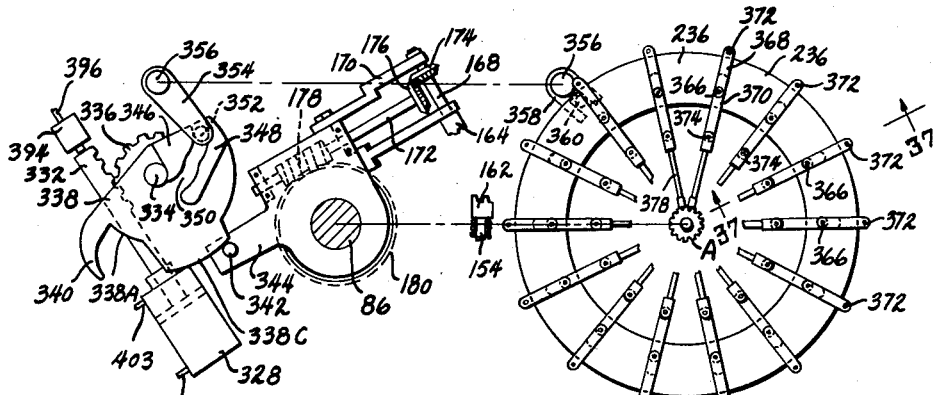
Figures 33, 34:
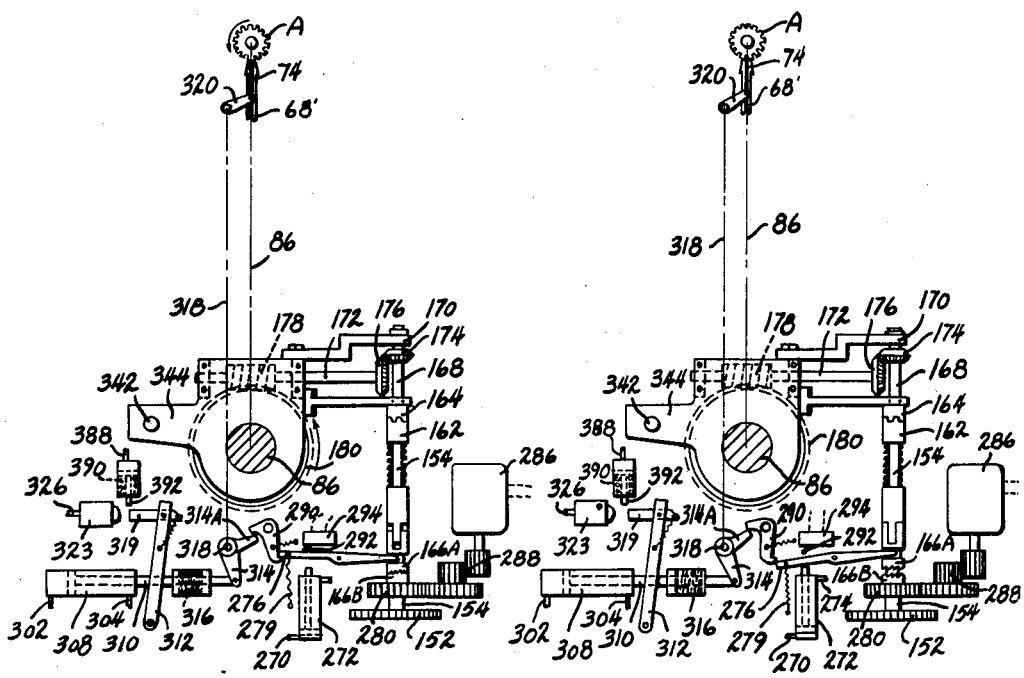
Figure 35:
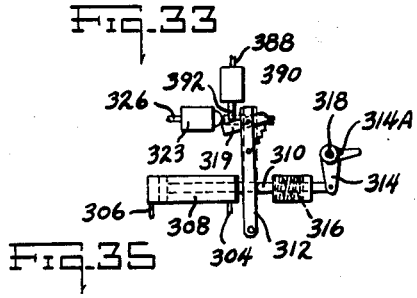

Figs. 9 to 19 inclusive are plan views showing schematically the different steps in the cycle of operation of the machine as it positions the generator armature coils in the armature slots;

Fig. 20 is a tabulation of the steps of the cycle as related to the other figures of the drawings;

Fig. 21 is a schematic diagram of the electrical and fluid pressure relations of the machine;

Fig. 22 is an exploded view of the machine elements operating on the main shaft;

Fig. 22A is a sectional elevation of a detail of Fig. 22;

Figs. 23 and 24 are elevational views of an element of the machine in two different operational positions;

Fig. 25 is a plan view of the operational plane of the machine;

Figs. 26, 27, and 28 are elevational views, similar to Fig. 25, simplified for clarity, showing different operational positions of one set of machine elements;

Figs. 29, 30, 31, 31A and 32 are views of various details of the mechanism shown in Fig. 25;

Figs. 33, 34, and 35 are plan views showing different operational positions of one of the mechanisms shown in Fig. 22;

Fig. 36 is a plan view showing a different operational position of one of the mechanisms shown in Fig. 22;

Fig. 37 is a sectional elevation taken along line 37—37 of Fig. 36.

Figure 1:
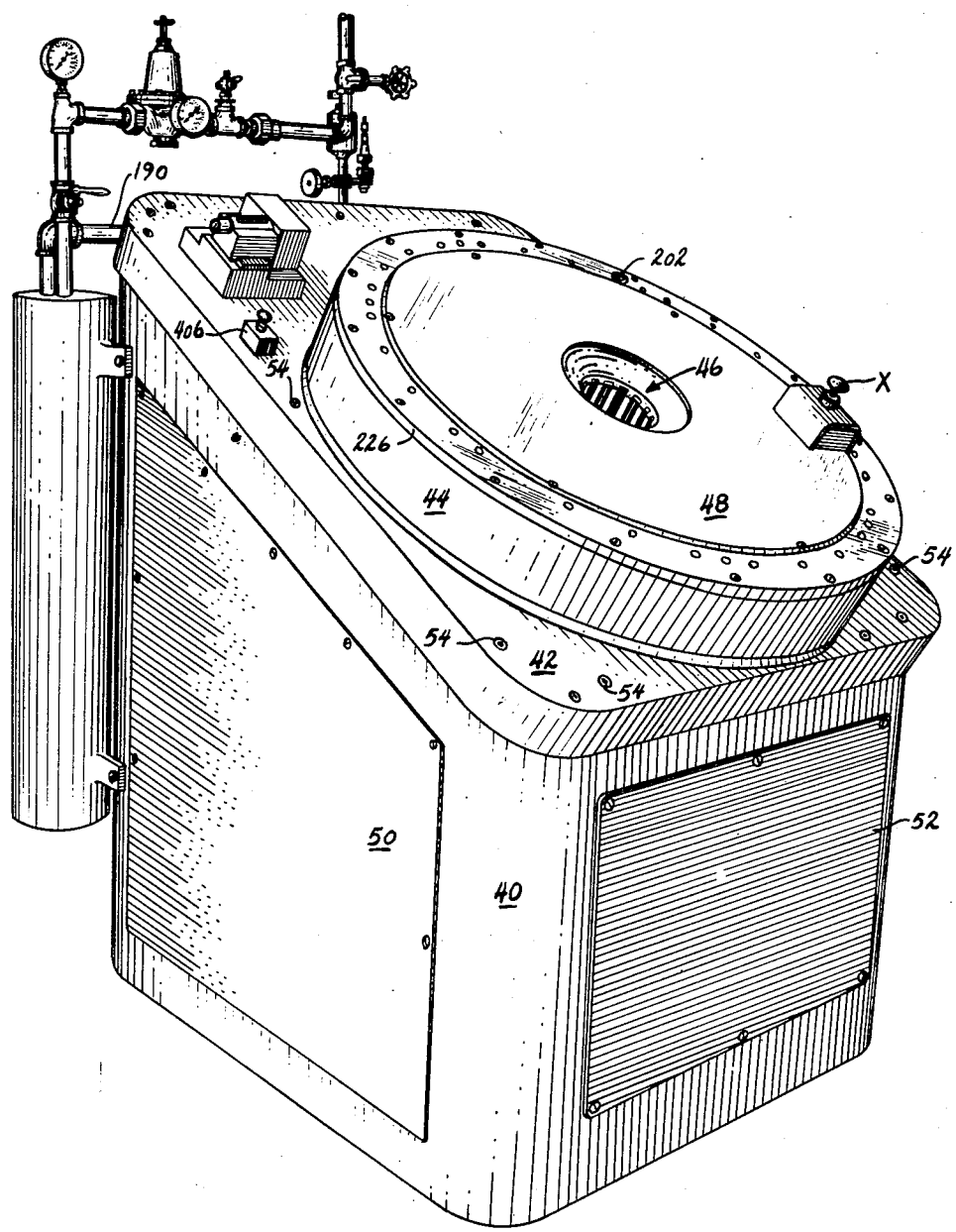
Fig. 1 is a perspective elevation of the machine tool incorporating the invention.
Figure 2:
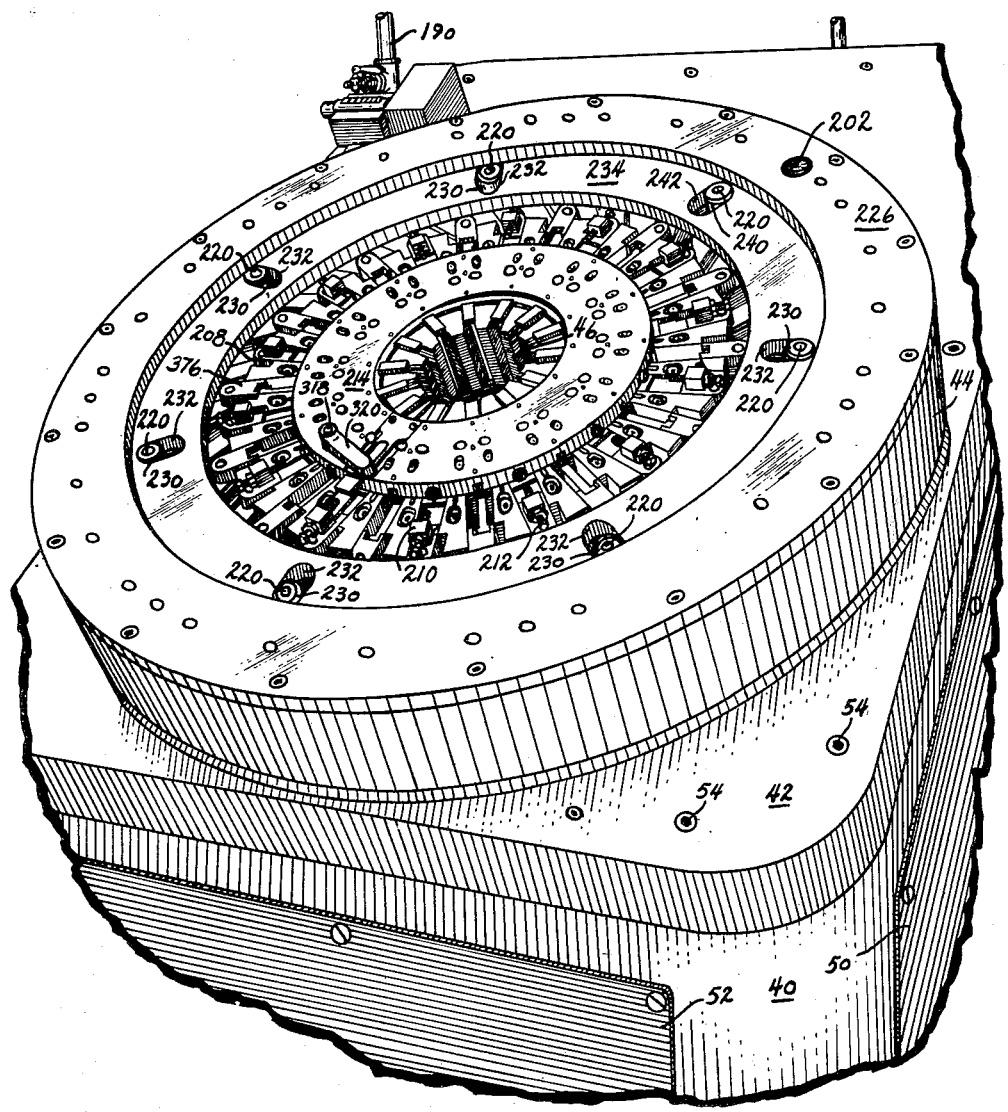
Fig. 2 is a perspective elevation of the machine with an upper protective plate removed to show some of its details.
Figure 2S:
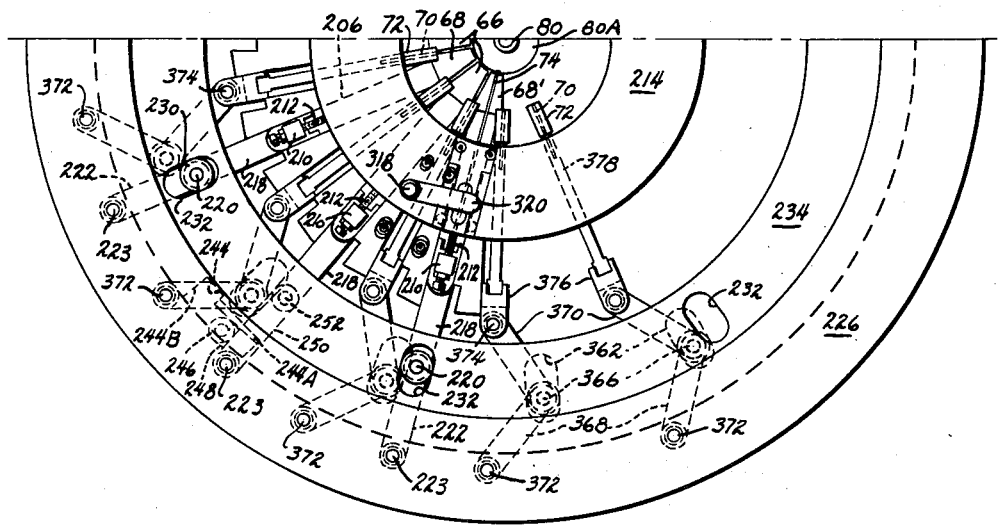

Referring now to the drawings, particularly to Figs. 1 and 2, the machine tool incorporating the invention is shown in perspective view. A box-like frame 40 is provided having an oblique upper surface 42 on which is mounted a circular boss 44 having a concentric aperture 46, into which the operator places an armature for the purpose of having its coil sides positioned in their respective armature slots as will be further described hereinafter. In Fig. 2, an upper cover plate 48 (attached by screws to the boss 44) is removed to show the operative mechanism located in the boss 44 for completing a cycle of operation on the armature deposited in the aperture or pocket 46. Within the frame 40, below the oblique upper face-plate 42, a mass of operating mechanism is mounted, as will be further described hereinafter, said mechanism being enclosed by cover plates 50 and 52 which are conveniently attached to the frame by means of screws as shown. The face-plate 42 is of massive construction to give the necessary strength and is mounted obliquely for the convenience of the operator. Bolts 54 are used to attach the face-plate to the frame 40.

Figure 3:
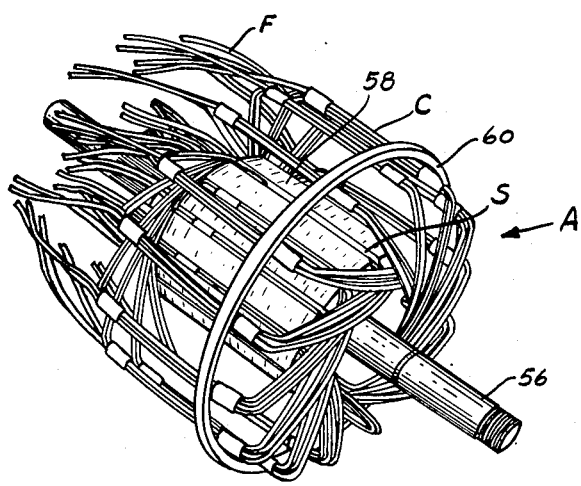
Fig. 3 is a perspective elevation of a generator armature ready to be positioned in the machine.

For purposes of clarity and to give a clearer understanding of the details of the complex machine which incorporates the invention, a description thereof will first be given of the operation of the machine with reference to the product on which it works, namely, the generator armature with its coils partially mounted therein substantially as shown in Fig. 3, wherein the machine, by steps to be described, mounts the free coil sides in their respective slots to bring the armature to its final condition as it leaves the machine as shown substantially in Fig.

6. After the general operative description of the machine as related to its product, detailed description will be set forth of the specific mechanisms which bring about these results in the machine which will be subdivided into separate headings for clarity.

The generator armature A, shown in Fig. 3, is the product of a production line which has assembled the separate elements of the armature to the condition shown in the drawing. The shaft 56 with its slotted laminations 58 is first assembled in the well known manner, which need not be described in further detail. Thereafter, the lower or first side of the separately wound and taped coils C are manually mounted on the armature laminated core within a coil for each slot S which partially nest as shown, being temporarily held in position by an embracing ring 60 to prevent displacement from the slots. It will be noted that the free ends of each of the double coils each consisting of two separate strands of wire extend parallel to the armature shaft 56 in the direction toward the left (Fig. 3) on which end will be mounted a commutator at a later time.

Figure 5:
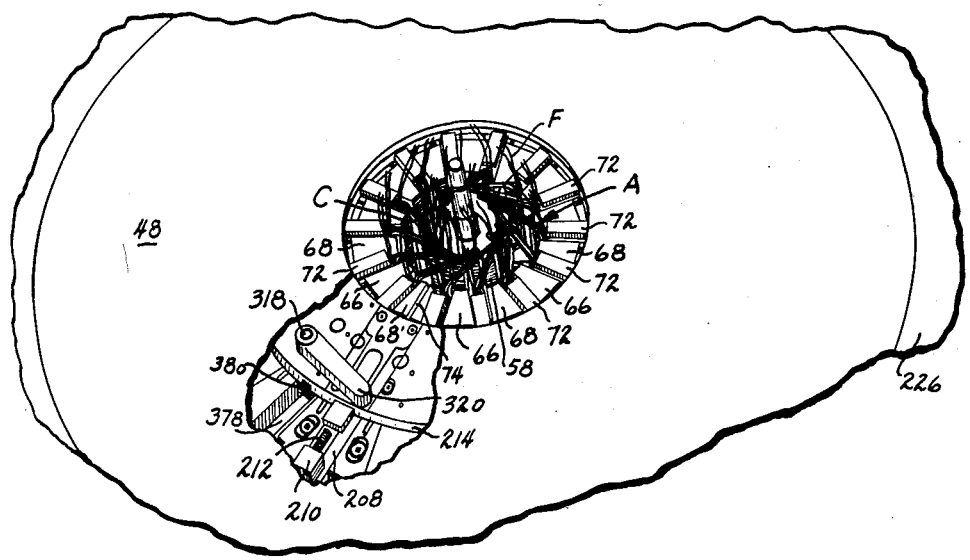
Fig. 5 is a perspective elevation, similar to Fig. 4, showing the armature in its first or initial relation with the machine.
Figure 4:
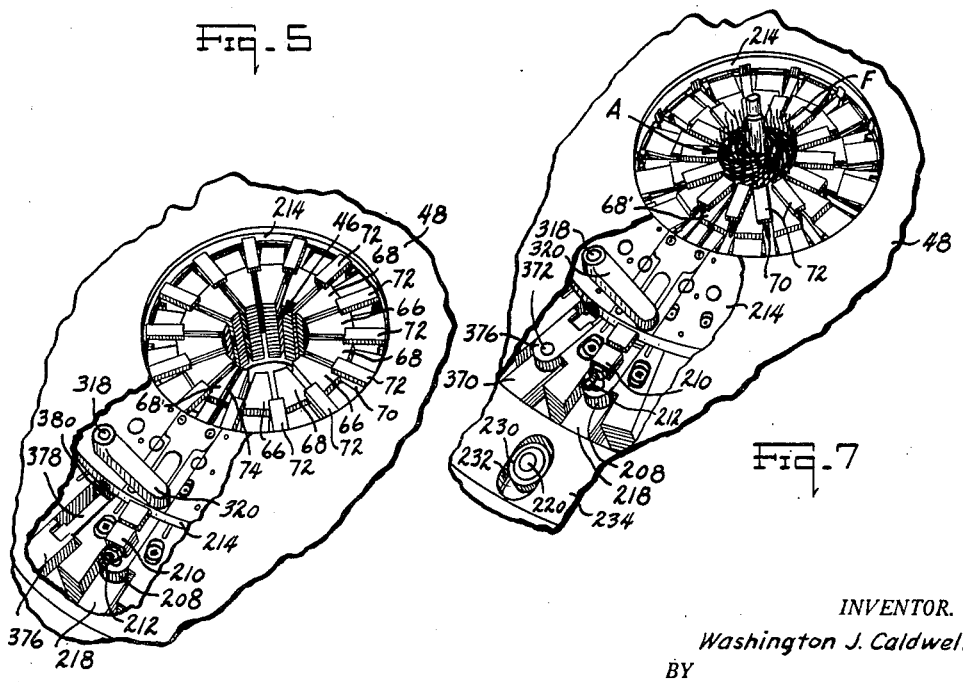
Fig. 4 is a perspective elevation of a detail of the machine showing the pocket into which the operator places the armature shown in Fig. 3.
Figure 7:
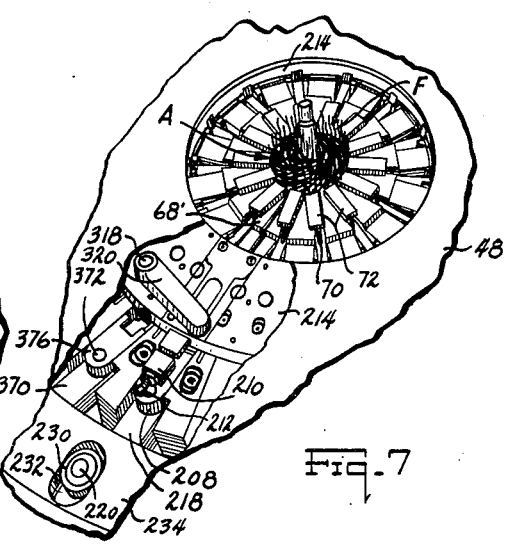
Fig. 7 is a perspective elevation similar to Fig. 4, except that the machine has just completed its cycle of operation on the generator armature.

With the generator armature pre-assembled and in the conditions shown in Fig. 3, an operator takes the armature with its ring 60 to hold it in assembled relation, and deposits it in the aperture 46 with the free ends F of the coils C extending upwardly as shown in Fig. 5. As the armature enters the aperture or pocket 46, the ring 60 is displaced upwardly and is thereafter removed by the operator and no longer plays a part in the operation. It is essential that the operator place the lower end of the armature shaft (distal from the commutator end) into a chucking device 62 located at the bottom of the pocket 46 and concentric therewith, as shown in Figs. 21 and 8, the latter showing a chuck 62 in section with its operating mechanism to be described hereinafter. Furthermore, it is essential to have the operator when he places the armature A in the pocket to make certain that each of the free coil sides of the coil C is engaged with one of the series of peripheral bights 64 lining the sides of the pocket 46 as is best seen in Fig. 9 where the retractable elements 66 and 68 forming the pocket are in fully retracted position, separated by pushers 70, each surmounted by flanges 72, which terminate at the bottom of the bights 64. The retractable elements 66 and 68 are in the form of a truncated sector with the forward faces formed as an arc having substantially the same radius as that of the laminated core of the armature with which they cooperate closely when in innermost position as shown in Fig. 12. This inward movement of the elements 66 and 68 is brought about by a mechanism to be described hereinafter. It will be noted by examining Fig. 11, that alternate elements 66 advance inwardly slightly in advance of the elements 68 which tends to hold the free coil sides in the bights 64 during this inward movement of these elements. Due to the sector-like shape of the elements 66 and 68, the inward movement of these elements causes a narrowing or constriction of the bights 64 with a rolling motion on the individual wires of the coil sides which is clearly shown in Figs. 11 and 12. In Fig. 11, an intermediate position is shown and in Fig. 12 a final position with the bights so narrow as to substantially flatten the free side of the coil C to a dimension which is only slightly larger than the diameter of the individual wires, as is clearly shown in Fig. 16. For the sake of clarity, this sequence of drawing is shown with only one coil, but it is to be understood that in the machine as actually used, there is a free coil side in each of the bights 64 corresponding to the number of slots on the armature core.

As a further precaution to prevent interference between the free sides of the coils and the elements 66 and 68 as they begin to move inwardly, the whole armature is slightly rotated by a mechanism to be further described hereinafter in a counter-clockwise direction as shown in Fig. 10. This slight movement of the armature pulls the coil tight against the side of the element 68, assuring the retention of the coil side in the bight 64 as the elements 66 and 68 move inwardly as has already been described.

Figure 14:
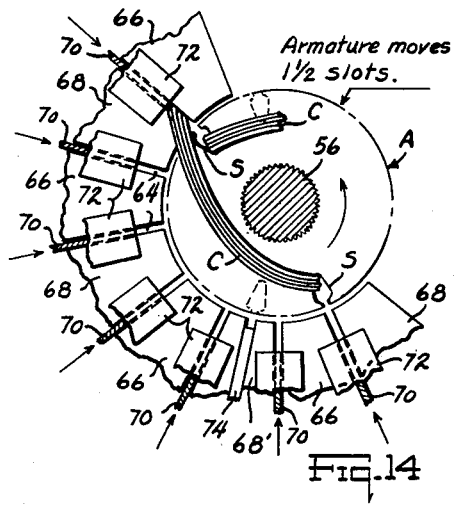

Up to this point in the cycle of operations, the relations of the armature core and the sector elements 66 and 68 in the pocket 48 have only been roughly located by manual manipulation by putting the armature in the pocket. However, in order that exact alignment be attained between the constricted bights 64, as seen in Fig. 12, with the constricted mouth of the armature core slots S, a special locating finger 74 is provided in one of the elements 68', which remains stationary while the element 68', in which it is mounted, moves in and out of cooperation with the armature. The locating finger 74 is actuated by a mechanism (to be described in detail hereinafter) after the elements 66 and 68 have moved to their innermost position, as shown in Figs. 12 and 13, which places a spring biased thrust on the finger in an inward direction, so that the forward face contacts the core of the armature A. Substantially simultaneously the armature A is rotated in a counter-clockwise direction, as shown in Fig. 13, until the locating or indexing finger 74 drops into the next adjacent slot as shown in the drawing. This action aligns all of the machine elements with the armature in readiness for the final rotation of the armature A over an angle of exactly one and one-half slots which is accomplished after the locating finger 74 has again been retracted from its cooperating slot. Inasmuch as the indexing finger 74 is located in the center of the element 68', and due to the fact that the free side of the coil C must be advanced to its corresponding armature slot depending on the armature design, the armature must always be advanced in steps of full slot distance of rotation plus one-half of a slot distance, so that proper alignment between armature slot and bight 64 may be attained. In the case of the present armature design, the armature must be advanced one and one-half slots in a counter-clockwise direction as is shown in Fig. 14. In the meantime, the pusher elements or inserting fingers 70 are simultaneously advancing inwardly toward the armature to thrust the free coil side down the constricted bight 64 to make it ready for entry through the mouth of the armature slot S which will be aligned with the bight by this time by the armature rotation mentioned hereinbefore.

Figure 15:
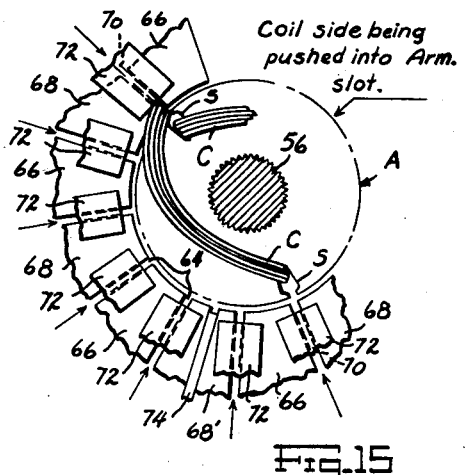
Figure 17:
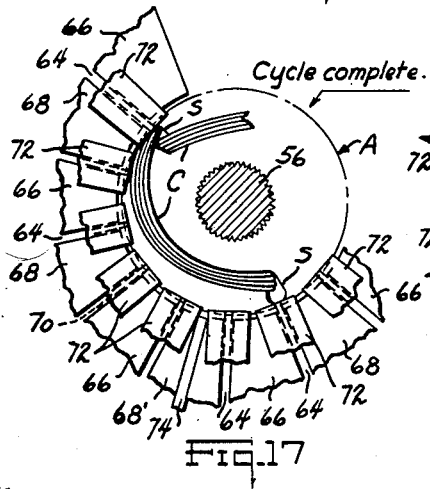

Referring now to Figs. 15 and 16, the relation of the machine parts, the coil C, and the armature A are shown at the time the coil is entering the armature slot. It will be noted in Fig. 16, that the wires of the free coil side have been moved to substantially an aligned relation along the narrow dimension of the constricted bight 64, so as to present a small dimension for ready entrance into the constricted mouth of the slot S which has already seated therein the lower coil side of another coil. The transverse dimension of the bight 64 at this time is slightly smaller than the transverse dimension of the slot mouth which will prevent galling of the wire as it enters the slot mouth in the event there is a slight irregularity in the armature dimension or in the alignment between the parts. The transverse dimension of the bight 64 is somewhat larger than the diameter of the wire of the coil as is clearly seen in Fig. 16, so as to give ample clearance for free movement of the free coil side under the thrust of the pusher 70. Under these conditions, the free coil side readily enters the slot, where the wires broaden out to fill the slot space below the mouth of the slot where they are thereafter held in position by well known means which are not related to the present invention. It should be noted that the alignment of the wires of the free coil side, as shown in Fig. 16, is attained during the step of the cycle in which the elements 66 and 68 are advanced inwardly into cooperative relation with the armature, which has already been described. The elements are advanced with the elements 68 in slightly retarded position which tends to roll the wires on each other to prevent jamming and crushing of the wires between the elements 66 and 68 as they move inwardly to constrict the bight 64 to the conditions shown in Fig. 16.

Figure 6:
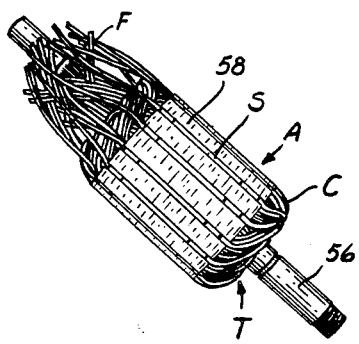
Fig. 6 is a perspective elevation of a generator armature after the machine has positioned the armature coils in their respective slots.
Figure 18:
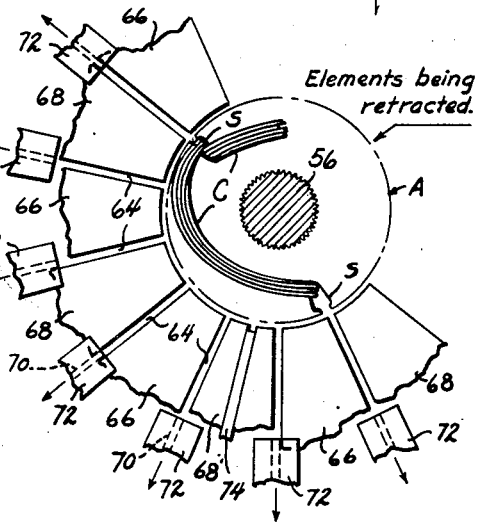
Figure 19:
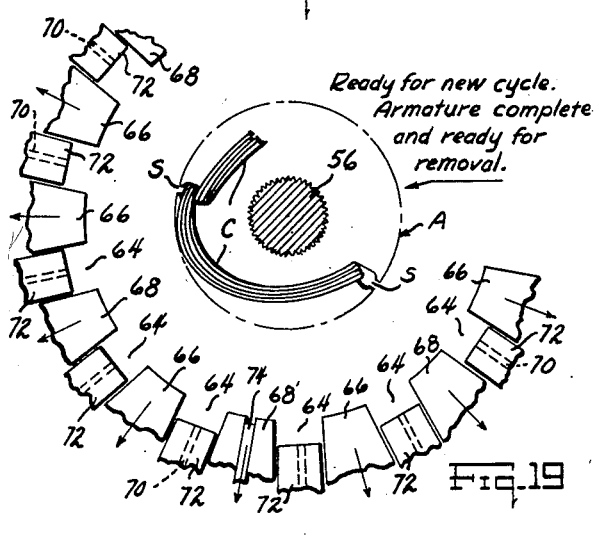

After the pusher elements 70 have thrust the free coil sides into their respective slots, the armature may be removed from the machine after all the elements 66, 68 and 70 have been retracted to original position ready for the initiation of a new cycle of operation. Elements 70 are first retracted, followed by the elements 66 and 68 which are retracted simultaneously as shown in Figs. 18 and 19. When the armature is removed by the operator, the clutching device 62 being automatically released, appears as shown in Fig. 6, after which it is ready for further operations on the production line.

Referring now to Fig. 20, the above described steps are set forth schematically with reference to the figures of the drawings illustrating the different steps.

The hereinbefore described steps set forth the operation of the machine as it is reflected by the product upon which it works. The description of the mechanisms by which the machine is enabled to perform these operations will now be described in detail under separate headings for quick reference.

*Armature chucking and initial rotating devices*

When the operator has inserted the armature A in the condition shown in Fig. 3 into the pocket 46 of the machine, substantially as in Fig. 5, the lower shaft extension 56 of the armature is fitted into a guiding sleeve 80 which is concentric with the axis of the pocket 46, being fitted into its floor as is shown in Fig. 8 by means of a plate 82 attached by screws 84 to a rotatable head 86, which extends downwardly to cooperate with machine elements to be described hereinafter. The head 86 is bored to form a seat for a cam sleeve 88 keyed thereto adjacent its upper end which cooperates with and actuates chuck elements 90 of the chucking device 62 already referred to which grip the armature shaft 56 when pulled downwardly by reciprocating shaft 92 fixed to the elements 90 by coacting with the cam surface 88a of the sleeve 88. The shaft 92 and the depending portions 90A of the chucking device are slidably fitted into counterbores 94 and 96 of the head 86.

The head 86 is rotatably mounted in a pair of spaced ball bearings 98 and 100 which are fitted into upper and lower spaced plates 102 and 104 affixed to the frame 40 in parallel relation. Longitudinal displacement of the head is prevented by a shoulder 106 and a sleeve 108, between which is fitted one element of the bearing 98. A pair of seals 110 are provided to retain lubricant in the bearing 98 and to prevent ingress of dirt or the like. A similar seal 112 is provided for the lower bearing 100. The rotating element of the bearing 100 is fixed between a sleeve 114 seated on a shoulder 116 of the head, and a lower collar 118 fitted to the lower terminus thereof, all as shown in Fig. 8. The collar 118 is provided with a lower flat face which cooperates with and forms a fulcrum for a pair of bellcranks 120 which cooperate with the shaft 92 to reciprocate it as already described to actuate the chucking elements 90 of the chucking device 62.

The lower end of the reciprocating shaft 92 is provided with a cupped plate 122 which seats the balled ends 124 of the bellcranks 120, the plate being adjusted longitudinally of the shaft by a pair of locking nuts 126 in threaded relation with the shaft. The plate 122 is initially positioned closely to the flat lower face of the collar 118, so that the rollers 128, journaled in the lower end of the bellcranks 120, ride on the low portion of cam head 130 affixed to the piston shaft 132 of an air cylinder 134. The air cylinder is mounted in depending relation by studs 136 conveniently fitted to the collar 118 so as to rotate with the head 86. The cam head 130 is adapted to move parallel to the longitudinal axis of the shaft 92, so that the roller moves to the high portion which thrusts them outwardly so as to thrust the shaft 92 downwardly by the action of the bellcranks 120 to thereby actuate the chucking device 62, so that the armature shaft 56 is firmly gripped. Obviously when the air cylinder is released, the opposite action occurs and the shaft 56 is dechucked and released.

Referring now to Fig. 21, wherein a diagram discloses the electrical connections and also the air pressure lines, the armature A is shown schematically cooperating with the chucking device 62. Shown also are the bellcranks 120, cylinder 134 and cam head 130. After the operator has placed the armature A in position in the machine, he presses the starting switch X, which energizes the magnetic operating coil 136 of the valve control 138 to place air pressure below the piston of the air cylinder 134 to push the cam head 130 upwardly to engage the clutching device 62 as already described. The valve control 138 is in communication with the air supply by conduit 140 and with the cylinder 134 by conduits 142 and 144. The air pressure during clutching is active in conduit 142, which, by a lateral conduit 146, communicates with a sequence valve 148, which will operate when the pressure applied to it reaches a predetermined value to lead the air pressure to the forward side of air cylinder 150 which creates a movement of about five degrees of the armature by rotating head 86 in which the armature A is chucked by previous action of the air cylinder 134. The mechanism for obtaining this 5° rotation of the armature will now be described in detail.

Referring now to Figs. 22, 22A, 23, and 24, a gear 152 is shown mounted fixedly on a stub shaft 153, which is suitably journaled in bearings to cooperate with a shaft 154 by an overrunning clutch 155 whereby gear 152 is capable of being rotated by a lever gear 156 pivoted on pin 158 as is shown in Figs. 23 and 24. The lever 156a of the gear 156 is connected by a shaft 160 to the piston of the air cylinder 150 already mentioned as being activated by the action of the sequence valve 148. The shaft 154 is provided at its far end with a spring wired element of a square tooth clutch 162 attached by a spline 163 (Fig. 22A), the other element 164 being movable in engagement and disengagement in the arc of a circle centered in the member 86 which houses the armature clutching device 62 by a mechanism to be further described hereinafter. Adjacent the gear 152, a dog tooth clutch 166 is provided with one element 166A affixed on the shaft 154 which allows one way rotation of the shaft 154 by the gear 152 in a clockwise direction (Figs. 23 and 24) by the lever gear 156, this clutch being capable of being engaged and disengaged at selected times by further mechanism to be described in detail hereinafter.

At this phase of the operating cycle, the square tooth clutch elements 162 and 164 are in engaged relation, so that the shaft 154 drives stub shaft 168 journaled in an arm 170 pivoted about the member 86 and rotatable thereabout. A transverse shaft 172 is driven by the stub shaft 168 through bevel gears 174 and 176 to rotate a worm 178 which drives worm gear 180 affixed to the member 86 (Fig. 8).

The ratios of the gears 152 and 156, 174 and 176, and the worm 178 with its worm wheel 180 are such that the movement of the lever gear 156 by the air cylinder 150 will move the member 86 through about five degrees of rotation in a counter-clockwise direction as has already been described with reference to Fig. 10 whereby the coils of the armature are tightened for purposes already set forth.

The lever gear 156 is provided with an extension 156b which, at the extreme of its movement by the air cylinder 150, contacts the actuating button of bleeder valve 182 which is in communication with control valve 184 (Fig. 21) by conduits 186 and 188. The control valve 184 is in communication with the source of fluid pressure by conduit 190, and connects the source of fluid pressure to the opposite ends of air cylinder 192 by conduits 194 and 196, the piston of which is connected by rod 198 to a crank 200 fixed to a shaft 202. For the next step in the cycle of operation, valve 184 is actuated by bleeder valve 182 in a manner to move the piston of the air cylinder 192 in a direction to rotate the crank 200 and its shaft 202 in a counter-clockwise direction, which moves the sector elements or spacer fingers 66 and 68 into cooperation with the armature periphery substantially as shown in Fig. 11 by a mechanism which will be described in the following paragraphs.

*Mechanism for moving retractable sector elements into and out of engagement with armature periphery*

Referring now to Figs. 25 to 30 inclusive, and also to Fig. 11, the sector elements 66 and 68 are moved from an outer initial position as shown in Fig. 9 to a cooperative relation with the periphery of the armature as shown in Figs. 12 and 13 in separate groups as is clearly shown in Fig. 11. These elements are moved in radial lines in guides 204 (Fig. 29) mounted in any convenient manner on the base plate 102 to cooperate with stems 206, preferably of squared conformation, which have fitted to their distal ends journals 208 which have an upward projection 210, into which a locked set screw 212 is threaded to cooperate with a stop ring 214 to limit the inward movement of the member 68. The journals 208 are provided with pivot pins 216 to mount a connecting rod 218 extending outwardly to cooperate with a second pivot pin 220 mounted in a link 222 which, in turn, is pivoted at its outer end on a pin 223 mounted in a fixed outer member 224 comprising a pair of ring plates 226 and a spacer 228. These pivoted members form a toggle element, best seen in Fig. 26 where they are shown in disalignment with the elements 68 in retracted initial position.

The knee of the toggle is formed at the pin 220 which extends beyond the link 222 to mount a roller 230 cooperating with a radial slot 232 in a rotatable ring-like plate 234, which is clearly shown in Fig. 2, being held in movable relation in the boss 44 by the upper ring plate 226, and slidable with relation to the links 222 which are cut away to provide a seat therefor as best seen in Fig. 29.

A second similar rotatable plate 236 is mounted between the lower cut away portion of the links 222 and the lower ring-like plate 226, whose function will be described hereinafter. The number of toggles utilized depends upon the number of slots in the armature, there being fourteen slots in the armature to be used in connection with this machine, and there are, therefore, seven of these toggle elements provided to move the sector elements 68 as is shown in Fig. 2.

The rotatable ring-like plate 234 is moved clockwise by the air cylinder 192 through the link 200, which rotates shaft 202 (Fig. 22) which is journaled in plates 226 as shown in Fig. 30 where a link 238 is affixed thereto to drive one of the selected pins 220, so that rotative force may be applied by the cooperation of its roller 240 with the circumambient enlarged slot 242. The roller 240 shown in Fig. 30 is provided with a stronger arbor to give greater strength inasmuch as all the force to drive the ring 234 is applied by it to drive all the elements 68. Shaft 202 is journaled in the ring 226 at the upper right hand station as shown in Fig. 2.

The driving forces for the sector elements 66 are also derived from the ring 234, which is provided with two-step notches 244 in its periphery which drive rollers 246 mounted on pins 247 affixed in ears 248 on links which correspond to links 222 in the driving relations of sector elements 68 already described. The remaining elements of the mechanism for driving sector elements 66 are the same and will not be described again. It is to be noted that the pin 252 in the link 250, which corresponds to the pin 220 in the driving elements for sector element 68, is shortened and is not provided with a roller at its upper end, the power in this instance being applied by the roller 246 cooperating with the notches 244 in the ring 234. The pin 252, however, is still the knee of the toggle which, due to the changed driving relation, advances sector elements 66 more quickly into cooperative relation with the armature than the sector elements 68. This is shown in Fig. 11, where the sector elements 66 are already in touching relation with the armature A, while the sector elements 68 are still in retracted position. This is brought about by the camming action of the steps of the slot 244 wherein the first step 244A is substantially radial and advances the elements 66 very quickly into cooperative relation with the armature A.

The power to move the sector elements 66 into cooperative relation is provided by the air cylinder 192 which rotates the ring 234 clockwise by a mechanism already described. Inasmuch as the notches 244 are in the rim of the ring 234, the sector elements 66 will begin to move inwardly first as soon as the ring is moved by the air cylinder. The reversal of application of fluid power to the air cylinder 192 will move all of the sector elements 66 and 68 from cooperative relation with the armature by clockwise movement of the arm 200 by the piston 198. This will move the ring 234 in a counter-clockwise direction and cause the face 244B of the notch 244 to contact the roller 246 to break the toggle and move the elements 66 back to their initial position. In the same time, the toggles controlling the movement of the sector elements 68 will be broken by the reverse action of the slot 232 on the roller 230 to cause the retreat of these elements to their initial position.

*Indexing device for armature*

The armature A, during a cycle of operation of the machine, is rotated about its longitudinal axis in three different angles at separate times; the first being illustrated in Fig. 10, where a slight rotation is brought about by mechanisms already described in order to tighten the coil slightly; the second angular rotation occurs when the indexing finger 74 is brought into cooperative relation with the next adjacent slot by rotating the armature in a counter-clockwise direction as shown in Figs. 12 and 13; and thirdly and lastly the armature is rotated one and a half slots to bring the armature slot into alignment with the coil side to be positioned therein for the final step as shown in Fig. 14. The mechanism for actuating the indexing finger 74 will now be described.

The indexing or locating finger 74 is housed in a slot in one of the sector elements 68 as shown in Figs. 9 to 12 and is capable of moving in a radial direction with reference to the armature A and is of a dimension to fit snugly into the throat of the slot S to locate the armature with reference to the machine elements whereby the machine elements are enabled to accurately position the remaining coil sides in their proper slots.

Referring now to Fig. 21, to the air cylinder 192, it will be noted that as the piston rod 198 moves outwardly to move the advance sector element 66 and 68 into cooperative relation with the armature, as already described, it will contact pivoted lever 260 provided with a pivoted finger lever 262 which is adapted to contact the control button 264 of control valve 266. The pivoted finger lever 262 also cooperates with an air trip 267 which may be actuated as will be described hereinafter to fold the finger lever 262 about its pivot to break its contactual relation with the button 264 to again release the control valve 266, which controls fluid pressure entering the valve by conduit 268 in communication with the conduit 190 communicating with the source of the pressure. Initially the fluid pressure is guided by the valve 266 to conduit 270 from conduit 268, conduit 270 communicating with the upper end of air cylinder 272 to hold the piston in retracted position as shown in Fig. 22. When the finger 262 actuates the valve 266, the fluid pressure is in communication with the lower end of the cylinder 272 by conduit 274, to thrust the piston upward which contacts one end of a pivoted lever 276 (Fig. 22) to urge it in a clockwise rotation about its pivot. The other end of the lever 276 is bifurcated and thrusts the movable element of dog tooth clutch 166A into engagement with the rotating element 166B (Fig. 22A). The clutch element 166A has a spline connection 278 with the shaft 154 so as to rotate therewith and yet allow limited longitudinal movement of the element 166A along the shaft for engagement and disengagement with the rotating element 166B. Spring 279, active on one end of the lever 276, acts to disengage the clutch elements.

The rotating element 166B is affixed to a gear 280 journaled on a sleeve 281 rotatable about and concentric with the shaft 154, suitable bearings 282 being provided for this purpose. The sleeve is held in fixed longitudinal position by collar 284. The gear 280 is driven by electric motor 286 through a suitable reduction gearing 288 (Fig. 22). The motor 286 rotates at constant speed during the operation of the machine and is enabled by engagement of the dog tooth clutch 166 to rotate the armature A by rotating shafts 154, 168, 172 and 86 by the various clutch and gear arrangements already described. The motor is energized from a source of electrical power as shown.

As the lever 276 moves clockwise about its pivot it engages a spring-urged latch 290 in the form of a pivoted bellcrank, which will hold the lever in a position where the elements of the dog tooth clutch 166A and 166B remain in engaged relation. At the same time, the lever 276 engages the actuating button 292 of an electrical control switch 294, which energizes one coil 296 of an electromagnetic control valve 298 in the initial position while, in the second position, it energizes a second coil 300 which places the conduits 302 and 304 alternately in communication with conduit 306 connected to the source of fluid pressure. The coils 296, 300, and switch 294 are in circuit with the source of electrical power as shown.

Conduits 302 and 304 are in communication with the ends of an air cylinder 308, the piston rod 310 of which is adapted to actuate a pivoted lever 312 and a bellcrank 314, which is resiliently connected to the piston rod by compressible spring 316, whereby after actuation of the air cylinder, the bellcrank 314 is urged in a counterclockwise direction. The other arm 314A of the bellcrank 314 is adapted to cooperate with the latch 290 to trip the same to thereby release the lever 276 and disengage the dog tooth clutch 166 after the bellcrank has moved a predetermined angle of rotation which is under control of the locating finger 74 cooperating with the armature A. To accomplish this purpose, the bellcrank 314 is affixed to shaft 318 which extends upwardly adjacent the armature where it is provided with an arm 320 which is adapted to move the locating finger 74 into engagement with the periphery of the armature A, against which it is resiliently urged by spring 316 until the finger 74 drops into the next adjacent slot. The armature A will be rotated by the electric motor 286 through its cooperating mechanism until the finger 74 drops into the first slot which allows rotation of the shaft 318 and bellcrank 314, so that the arm 314A can trip the latch 290 to release the lever 276 with the result that spring 279 will disengage the dog tooth clutch 166 to free the motor from the armature. In the meantime, the fluid pressure in conduit 302 which is in communication with conduit 322 has tripped lever 262 by actuating air cylinder 267, so that control valve 266 has placed conduit 268 in communication with conduit 274 to energize the opposite end of air cylinder 272 to retract its piston from contact with lever 276, so that when latch 290 is disengaged from lever 276, resilient means 279 can rotate the lever to initial position and disengage the dog tooth clutch 166 to free the motor from rotating the armature. When the lever 276 moves to its initial position, it no longer contacts the button 292 of the control switch 294, so that it returns to its initial position and energizes coil 300 of the control valve 298 to place conduit 304 in communication with conduit 306 which energizes the opposite end of air cylinder 308 to retract the piston rod 310 as well as the finger 74 through the bellcrank 314 and shaft 318. Upon the return of the piston rod 310, the pivoted arm 312, by its spring-biased folding finger 319, contacts the actuating button of bleeder valve 323 to actuate control valve 324 and place the fluid pressure, active in conduit 326, in communication with air cylinder 328 by means of conduit 330 to move piston rod and rack 332 forwardly and thereby rotate shaft 334 clockwise by cooperating with gear 336 affixed to the shaft 334.

The movement of the shaft 334 initiates the third and final rotation of the armature whereby the free coil side is aligned with its proper slot in the armature which requires rotation of the armature to an angle equal to one and a half times the slot displacement. The movement of the shaft 334 also initiates the movement of the mechanisms whereby pusher elements 72 are activated to move the free coil sides into final position in their respective armature slots.

*Mechanism for creating final armature rotation to align free coil side with its slot and mechanism for positioning coil side in said slot*

The elements of the machine, having been indexed and aligned with reference to the armature by the devices hereinbefore described, there remains only the aligning of the free coil side with its respective slot in the armature and the positioning of such free coil in final position in such slot. Thereafter it is necessary to clear the machine elements, so that all of the parts are returned to initial positions, so that a new cycle of operation may be inaugurated after the armature just completed has been removed from the machine and a new incomplete armature inserted in its stead.

As has been pointed out hereinbefore, the air cylinder 328 rotates shaft 334 by a rack (332) and gear (336) arrangement in a clockwise direction, Figs. 21 and 22, the shaft 334 being suitably journaled in bearings in a position parallel to the main shaft 86. Mounted on the shaft 334 is a cam plate 338 which has as a stop a projecting hook 340 to cooperate with a cam pin 342 located on a plate 344 journaled on the main shaft 86 just above the worm gear 180 which provides a convenient means to mount bearings 172A of the worm shaft 172 as is shown in Fig. 22. The shaft 86 is rotatable with respect to the plate 344 by the worm 178 operating affixed gear 180, but as the plate 344 rotates, it carries shaft 86 with it due to the locking of the worm and gear. The cam plate 338 has an edge formed as a cam surface comprising a concentric portion 338A, a riser cam element 338B, and a second concentric cam element 338C. The interaction of these cam surfaces and the pin 342 causes a rotation of the main shaft 86 through an angle equal to one and a half slots as is best seen in Fig. 36 where the main shaft is in its largest angular displacement. It will be noted that this rotation of the main shaft 86 carries with it the shafts 172 and 168 and separates the square tooth clutch elements 162 and 164 during this phase of the cycle.

Inasmuch as the sector elements 66 and 68 are stationary during this phase of the cycle, the free coil sides positioned in the slots between these elements will be held in fixed relation and the armature is rotated through an angle of one and a half slots and then alignment is accomplished between the armature slots and the slots between the sector elements wherein the free coil sides are to be found. All that remains thereafter is to push the free coil sides into their slots to place them in their final position in the armature.

To accomplish this end, a pair of plates 346 and 348 are positioned on the upper side of cam plate 344 having cooperating faces to form a cam path 350 which cooperates with a cam roller 352 mounted on an arm 354 affixed to shaft 356 which extends upwardly in parallel relation with the main shaft 86 and is provided at its upper end with a slotted arm 358 in the locus of the lower rotating plate 236 (Fig. 36) similar to plate 234 already described with reference to sector elements 66 and 68. As the cam plate 344 is rotated, the shaft 356 will be rotated in a counterclockwise direction by the cam roller 352, so that the plate 236 will be rotated in a clockwise direction by the cooperation between slotted arm 358 and pin 360 affixed in the plate 236 (Figs. 22 and 36).

Plate 236 is provided with substantially radial slots 362 which cooperate with rollers 364 attached to the pivotal knee pin 366 of a toggle formed by links 368 and 370. Link 368 is T-shaped and is pivoted at its outer end on pin 372 which is fixed in aligning apertures in fixed plates 226 (Fig. 37), while the inner link 370 is pivoted on movable pin 374 journaled in a yoke 376 affixed to the end of a slide member 378 guided by plates 380 attached to the base member 102 for longitudinal movement in a radial direction of the armature. At the inner end of the slide members 378, pusher element 70 is attached which is adapted to slide in the slots formed between the sector members 66 and 68 as has already been described above, being best seen in Figs. 14, 15, and 16. Transverse plate 72 is provided for purposes already set forth.

As the knee of the toggle consisting of links 368 and 370 is straightened, the pusher element 70 thrusts the free coil sides of each coil into the aligned slot S of the armature, as is clearly shown in Fig. 16, and, when at its final position, distributes the coil in the bight of the slot S as shown in Fig. 18 well below its mouth, so that the coil side will remain in this final position after retraction of the pusher element 70 as shown in Fig. 18.

The conduit 330, in communication with the air cylinder 328 is paralleled by a second conduit 382 (Fig. 21) in communication therewith which leads to an air cylinder 384 with a spring-retracted piston to actuate a counter 386 necessary for accurate tabulation of the operation of the machine. The conduit 382 is also provided with a branch conduit 388 which communicates with air cylinder 390 also having a spring-retracted piston whose rod 392 actuates and trips the spring-biased folding finger 320 of the lever 312 which actuates bleeder valve 322 for controlling valve 324 to inaugurate the operation of cylinder 328. With the tripping of the finger 320, the fluid pressure is maintained on the cylinder 328 until the machine is cleared by a mechanism to be described hereinafter.

*Mechanism for clearing the machine for new cycle of operation*

Referring again to Fig. 21 and Fig. 36, it will be seen that the piston rod 332 of air cylinder 328, when in fully extended position, contacts the actuating button of bleeder valve 394 which communicates by conduit 396 with control valve 138 which changes the valve position to place conduit 140 containing fluid pressure in communication with conduit 144 leading to the upper side of air cylinder 134 to retract its piston to the initial position and thereby release the armature chucking device 62, so that the completed armature can be removed from the machine.

Conduit 144 is provided with a lateral conduit 400 which communicates with air cylinder 150 to reverse the application of fluid pressure therein and move the lever gear 156 by its piston to its initial position, which does not move shaft 154 due to the over-running clutch 155. The arm extension 156B changes the position of bleeder valve 182 which controls valve 184 to reverse the application of fluid pressure on air cylinder 192, so that its piston retracts the piston rod 198 to move the toggle members actuating sector members 66 and 68 whereby these members are retracted substantially simultaneously from the periphery of the armature to their initial position shown in Fig. 9. This allows easy removal of the finished armature from the machine by the operator.

Conduit 400 is also provided with a lateral conduit 402 which communicates with actuating mechanism for bleeder valve 402A which changes the position of control valve 324 to reverse the application of fluid pressure to air cylinder 328 by conduit 403 whereby the rod 332 is retracted to initial position to carry the machine elements on shaft 334 and 356 to their initial position shown in Fig. 22. With the shaft 356 retracted to initial position, the pusher elements 70 will also be retracted to the position shown in Fig. 9. The square tooth clutch elements 162 and 164 will be reengaged. The machine is now in condition to begin a new cycle of operation.

For purposes of control, the conduits between the control valves and their cooperating air cylinders are provided with manually controlled throttling valves marked "VT" on the drawings. In this way, the sequential operation can be controlled for suitable timing, so that each step of the cycle will be carried out in essential timing with the other steps. The electrical elements of the machine are conveniently connected to a power transformer 404 having A. C. power supplied from the usual sources.

A manually operated bleeder valve 406 is provided to communicate by conduit 408 with conduit 396, so that a clearing of the machine can be inaugurated by the operator at any time it becomes necessary in the event of an emergency.

Referring to Fig. 8, it will be noted that sleeve 80 is provided at its base with an outwardly extending plate 80A which has a dished upper face to cooperate with the windings at the lower armature end to aid in conforming the windings into a smooth torus shaped conformation as shown in Fig. 6 at T.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a device for positioning the free sides of multi-wire partially-inserted armature coils in the slots of an armature, mounting means including a releasable clutch to rotatably hold the armature in operative position in the device by its shaft, motor means to drive the elements of the device, radially-moving means including sector elements encircling the armature and positioned on the mounting means to grip the free sides of each of the coils between the sector elements, indexing means positioned in a sector element to index the clutch rotating the armature with reference to the armature slots, means cooperating with the mounting means and controlled by the indexing means to rotate the armature through an angle to align the free coil sides with their final respective armature slots, pusher means positioned between the sector elements of the radially-moving means to move all of the free coil sides simultaneously into the slots of the armature, and means to control the elements of the machine for cyclic operation.

2. In a device of the class described, mounting means to rotatably hold the armature in operative position in the device with the lower side of each coil inserted in each slot, rotating means on the mounting means to rotate the armature through a predetermined angle at selected times, lock means to secure the armature to the rotating means, radially-moving encircling means coaxial with the armature and positioned on the mounting means to simultaneously grip the free sides of each of the coils being adapted by radial inward movement to cooperate closely with the armature to align by a rolling motion the wires of the multi-wire coil sides to a dimension less than the dimension of an armature slot opening, indexing means positioned in a portion of the encircling means and adapted to move into an armature slot to index the armature with the rotating means, means to retract the indexing means and actuate the lock means to establish the operative relation of the rotating means with reference to the armature, being adapted to initiate relative rotation between the coil gripping portion of the encircling means and the armature to align the free coil sides with their respective armature slots, and pusher means cooperating with the encircling means to thereafter move the free coil sides simultaneously into the slots of the armature.

3. In a device of the class described, mounting means including a releasable chuck to rotatably hold the armature in operative position with the lower side of the multi-wire coils inserted in each of the slots of the armature, means to control the chuck, radially-moving means encircling the armature positioned on the mounting means to simultaneously grip each of the free sides of the coils from a radial position, means forming a part of the encircling means gripping the coil sides to flatten the free coil sides to a dimension slightly more than the diameter of a single wire as the means encircling the armature moves radially inward, resilient finger means positioned in a portion of the encircling means to index the armature by dropping into a slot with reference to the means to control the chuck, whereby the chuck grips the armature, means cooperating with the chuck to retract the finger means and cause relative rotation between the coil-gripping portion of the encircling means and the armature to align the free coil sides with their respective armature slots, and means cooperating with the coil-gripping portion to radially move the coil sides simultaneously into the slots of the armature by passing single wires through the slots until all are positioned in the slots.

4. In a device for automatically positioning the free sides of multi-wire partially-inserted armature coils in the slots of an armature by power means, mounting means to hold the armature in operative position including a means to rotate the armature at selected times, radially-moving means on the mounting means adapted to move inwardly to closely encircle the armature and to automatically grip the free sides of each of the coils, indexing means positioned in one portion of the radially-moving means to cooperate with an armature slot at selected times when the radially-moving means closely encircles the armature, said cooperative relation being caused by controlled rotation of the armature, means controlled by the indexing means to cause predetermined angular rotation of the armature to align the free coil sides with their respective armature slots, and pusher means cooperating in timed relation with the armature rotation to move all of the free coil sides simultaneously into the slots of the armature.

5. In a device for positioning the free sides of multi-wire armature coils in the slots of the armature, mounting means to hold the armature in operative position with the lower coil side of each coil inserted in a slot, rotating means on the mounting means to cause rotation of the armature at selected times, radially-moving means coaxial with the mounting means encircling the armature to grip the free sides of all of the coils when moving inwardly to closely cooperate with the armature, constricting means forming a part of the radially-moving means to compress the coil side of each coil by a rolling action to prevent binding to a dimension less than the dimension of the armature slot opening, indexing means positioned in a portion of the radially-moving means to stop relative rotation of the armature by cooperating with a slot therein, means to retract the indexing means and to initiate rotation of the armature to align each free coil side with its respective armature slot, and pusher means cooperating with the radially-moving means to move all of the free coil sides simultaneously into the slots of the armature.

6. In a device of the class described, mounting means including a base to hold an armature by its shaft in operative position in the device with the lower side of each coil preinserted in each slot of the armature, power means to drive the elements of the device, releasable chuck means cooperating with the shaft of the armature being adapted to rotate the armature at selected times, means to control the locking of the chuck and its rotation of the armature at selected times, radially-moving means including cooperating sector portions positioned on the mounting means in the plane of the armature core to closely encircle the perimeter of the armature core being adapted to simultaneously grip the free sides of each of the coils between its sector portions, finger means positioned in a sector portion of the radially-moving means resiliently urged toward the armature and adapted when the said radially-moving means is in innermost position to enter the next adjacent slot of the armature when the chuck means rotates the armature in a counterclockwise direction, said resilient finger after entering the slot of the armature being adapted to initiate locking of the chuck to the armature shaft, means to retract the finger from the slot, and to cause the chuck to rotate the armature counterclockwise relative to the encircling radially-moving means through an angle to align the free coil sides with their respective final armature slots, inserting means positioned between the sector portions of the radially-moving encircling means to move the free coil sides simultaneously into the final slots of the armature, control means to adapt the elements of the device for sequential operation, and means driven by the power means to clear the device after the insertion of the free coil sides into the slots of the armature to return it to initial condition to allow cyclic operation of the device on a series of armatures.

7. In a device of the class described, mounting means including a base to hold an armature by its shaft in operative position in the device with the lower side of a coil preinserted in each slot of the armature, power means to drive the elements of the device, releasable chuck means on the mounting means cooperating with the shaft of the armature being adapted to rotate the armature at selected times, means to control the locking of the chuck and its rotation of the armature at selected times, radially-moving means including sector portions positioned on the mounting means to closely encircle the perimeter of the armature being adapted to simultaneously grip the free sides of each of the coils between its sector portions, resilient finger means positioned in a sector portion of the radially-moving means adapted when the said radially-moving means is in innermost position to enter the next adjacent slot of the armature when the chuck means rotates the armature, said resilient finger after entering the slot of the armature being adapted to initiate locking of the chuck to the armature shaft, means to retract the finger from the slot and to cause the chuck to rotate the armature relative to the encircling radially-moving means through an angle to align the free coil sides with their respective final armature slots, inserting means positioned between the sector portions of the radially-moving encircling means to move the free coil sides simultaneously into the final slots of the armature, and control means to adapt the elements of the device for sequential operation, including means to clear the device after the insertion of the free coil sides in the slots of the armature to return the device to initial condition to allow cyclic operation of the device on a series of armatures.

8. In a device of the class described, mounting means including a base to hold an armature by its shaft in operative position in the device with the lower side of a coil preinserted in each slot of the armature, power means to drive the elements of the device, releasable chuck means on the mounting means cooperating with the shaft of the armature being adapted to rotate the armature at selected times, means to control the locking of the chuck and its rotation of the armature at selected times, radially-moving means including sector portions positioned on the mounting means to closely encircle the perimeter of the armature being adapted to simultaneously grip the free sides of each of the coils between its sector portions, resilient finger means positioned in a sector portion of the radially-moving means adapted when the said radially-moving means is in innermost position to enter the next adjacent slot of the armature when the chuck means rotates the armature, said resilient finger after entering the slot of the armature being adapted to initiate locking of the chuck to the armature shaft, means to retract the finger from the slot, means actuated by the retraction of the finger to cause the chuck to rotate the armature relative to the encircling radially-moving means through an angle to align the free coil sides with their respective final armature slots, inserting means positioned between the sector portions of the radially-moving encircling means to move the free coil sides simultaneously into the final slots of the armature, and control means to adapt the elements of the device for sequential operation.

9. In a device of the class described, mounting means to hold an armature in operative position in the device with the lower side of a coil inserted in each slot of the armature, releasable chuck means cooperating with the shaft of the armature being adapted to rotate the armature at selected times, means to control the locking of the chuck and its rotation of the armature at selected times, radially-moving means positioned on the mounting means to closely encircle the armature being adapted to simultaneously grip the free sides of each of the coils, resilient finger means positioned in a portion of the radially-moving means and adapted when the said radially-moving means is in innermost position to enter the next adjacent slot of the armature when the chuck means rotates the armature, said resilient finger after entering the slot of the armature being adapted to lock the chuck to the armature shaft and retract itself thereafter from the slot, means actuated by the retraction of the finger to cause the chuck to rotate the armature relative to the encircling radially-moving means through an angle equal to one and one-half slots of the armature to thereby align the free coil sides with their respective armature slots, inserting means positioned in portions of the radially-moving encircling means to move the free coil sides simultaneously into the slots of the armature, power means to drive the elements of the device for sequential operation, and means driven by the power means to clear the device after the insertion of the free coil sides into the slots of the armature to return it to initial condition to allow cyclic operation of the device on a series of armatures.

10. In a device of the class described, mounting means including a base to hold an armature by its shaft in operative position in the device with the lower side of the multi-wire coils inserted in each of the slots of the armature, power means to drive the elements of the device, inwardly-movable means including sector portions positioned on the mounting means and closely encircling the armature in inwardmost position to simultaneously grip each of the free sides of the coils between the sector portions which are adapted to flatten the free coil sides to a dimension slightly more than the diameter of a single wire, means on the mounting means to rotate the armature at selected times, means positioned in a sector portion of the inwardly-movable means to index the means to rotate the armature with reference to the armature slots by controlled relative rotation, control means on the mounting means actuated by the indexing means to control the elements of the device to cause relative rotation between the coil gripping sector portions and the armature through an angle equal to one and a half slots to align the free coil sides with their respective armature slots, inserting means between the sector portions of the inwardly-movable means to move the coil sides simultaneously into the slots of the armature by passing single wires through the slots until all are positioned in the slots, and means to clear the device for cyclic operation on a series of armatures.

11. In a device of the class described, mounting means to hold an armature by its shaft in operative position in the device with the lower side of a coil inserted in each slot of the armature, releasable chuck means cooperating with the shaft of the armature being adapted to be locked thereto to rotate the armature at selected times, means to rotate the chuck means, means to control the locking of the chuck and its rotation of the armature at selected times, radially-moving means positioned on the mounting means to closely encircle the armature in substantially touching relation being adapted to simultaneously grip the free sides of each of the coils, means to move the radially-moving means at selected times, resilient finger means positioned in a portion of the radially-moving means adapted when the said radially-moving means is in innermost position to enter the next adjacent slot of the armature when the chuck means rotates the armature, said resilient finger after entering the slot of the armature being adapted to initiate locking the chuck to the armature shaft and retract itself thereafter from the slot, means actuated by the retraction of the finger to cause the chuck to rotate the armature relative to the encircling radially-moving means through an angle equal to one and one-half slots of the armature to thereby align the free coil sides with their respective armature slots, inserting means positioned between portions of the radially-moving encircling means gripping the coil sides to move the free coil sides simultaneously into the slots of the armature, power means including control elements to drive the elements of the device for sequential operation, and means driven by the power means to clear the device after the insertion of the free coil sides into the slots of the armature to return it to initial condition to allow cyclic operation of the device on a series of armatures.

12. In a device of the class described, mounting means to hold an armature by its shaft in operative position in the device with the lower side of a coil preinserted in each slot of the armature, releasable chuck means cooperating with the shaft of the armature being adapted to rotate the armature at selected times, means to control the locking of the chuck and its rotation of the armature at selected times, radially-moving means positioned on the mounting means to closely encircle the perimeter of the armature being adapted to simultaneously grip the free sides of each of the coils and to constrict said coil sides to a dimension slightly larger than the diameter of one wire thereof, resilient finger means positioned in a portion of the radially-moving means and adapted when the said radially-moving means is in innermost position to enter the next adjacent slot of the armature when the chuck means rotates the armature to index the elements of the device, said resilient finger after entering the slot of the armature being adapted to lock the chuck to the armature shaft and retract itself thereafter from the slot to allow further rotation of the armature, means actuated by the retraction of the finger to cause the chuck to rotate the armature relative to the encircling radially-moving means through an angle to align the free coil sides with their final respective armature slots, inserting means positioned in portions of the radially-moving encircling means to move the free coil sides simultaneously into the slots of the armature, power means including control elements to drive the elements of the device for sequential operation, and means driven by the power means to clear the device after the insertion of the free coil sides into the slots of the armature to return the elements of the device to initial condition to allow cyclic operation of the device on a series of armatures.

13. In a device of the class described, mounting means including a releasable rotatable chuck to hold the armature in operative position with the lower side of a coil inserted in each slot of the armature, means to control the chuck adapted to rotate the armature at selected times, radially-moving means cooperating with the mounting means to simultaneously grip the free sides of each of the coils and by a rolling motion during radial inward movement align the wires of the multi-wire coil sides to a dimension less than the dimension of the slot opening, resilient finger means positioned in a portion of the radially-moving means adapted when the same is in inward position to enter the next adjacent slot of the armature by relative rotation between the armature and the said radially-moving means to lock the chuck with reference to the armature, means cooperating with the chuck to cause relative rotation between the coil gripping portion and the armature for one and a half slots thereof to align the free coil sides with their respective armature slots, inserting means cooperating with the radially-moving means to move the free coil sides simultaneously into the slots of the armature, power means to drive the device, and means to clear the device to return it to the initial condition to allow cyclic operation of the device on a series of armatures.

14. In a device of the class described, mounting means including a base to hold an armature by its shaft in operative position in the device with the lower side of a coil preinserted in each slot of the armature, power means to drive the elements of the device, releasable chuck means cooperating with the shaft of the armature being adapted to rotate the armature at selected times, means to control the locking of the chuck and its rotation of the armature at selected times, radially-moving means including sector portions positioned on the mounting means to closely encircle the perimeter of the armature, being adapted to simultaneously grip the free sides of each of the coils between its sector portions, resilient finger means positioned in a sector portion of the radially-moving means adapted when the said radially-moving means is in innermost position to enter the next adjacent slot of the armature when the chuck means rotates the armature, said resilient finger after entering the slot of the armature being adapted to initiate locking of the chuck to the armature shaft and retract itself thereafter from the slot, means actuated by the retraction of the finger to cause the chuck to rotate the armature relative to the encircling radially-moving means through an angle to align the free coil sides with their respective final armature slots, inserting means positioned between the sector portions of the radially-moving encircling means to move the free coil sides simultaneously into the final slots of the armature, control means to adapt the elements of the device for sequential operation, and means driven by the power means to clear the device after the insertion of the free coil sides into the slots of the armature to return the device to initial condition to allow cyclic operation of the device on a series of armatures.

References Cited in the file of this patent

UNITED STATES PATENTS

| | | |
|---|---|---|
| 1,964,441 | Phelps | June 26, 1934 |
| 2,074,366 | Collins | Mar. 23, 1937 |
| 2,192,801 | Poole | Mar. 5, 1940 |
| 2,272,263 | Cullin | Feb. 10, 1942 |
| 2,281,917 | Collins | May 5, 1942 |